(12) United States Patent
Edman (10) Patent No.: US 10,156,249 B2
(45) Date of Patent: Dec. 18, 2018

(54) PORTABLE STAGE SYSTEM

(71) Applicant: Sico Incorporated, Edina, MN (US)

(72) Inventor: Matthew Neal Edman, Hamel, MN (US)

(73) Assignee: Sico Incorporated, Edina, MN (US)

( * ) Notice: Subject to any disclaimer, the term of this patent is extended or adjusted under 35 U.S.C. 154(b) by 0 days.

(21) Appl. No.: 15/435,038

(22) Filed: Feb. 16, 2017

(65) Prior Publication Data

US 2017/0234344 A1 Aug. 17, 2017

Related U.S. Application Data

(60) Provisional application No. 62/296,469, filed on Feb. 17, 2016.

(51) Int. Cl.
| | | |
|---|---|---|
| *F16B 9/02* | (2006.01) | |
| *A47B 9/20* | (2006.01) | |
| *E04H 3/28* | (2006.01) | |
| *F16B 2/06* | (2006.01) | |
| *F16B 2/18* | (2006.01) | |
| *F16B 2/14* | (2006.01) | |

(52) U.S. Cl.
CPC ............... *F16B 9/023* (2013.01); *A47B 9/20* (2013.01); *E04H 3/28* (2013.01); *F16B 2/06* (2013.01); *F16B 2/14* (2013.01); *F16B 2/185* (2013.01)

(58) Field of Classification Search
CPC .... F16B 9/023; F16B 2/06; F16B 2/14; F16B 2/185; A47B 9/20; E04H 3/28
See application file for complete search history.

(56) References Cited

U.S. PATENT DOCUMENTS

| | | | | |
|---|---|---|---|---|
| 2,849,249 A | * | 8/1958 | Fridolph | A45B 23/00 248/412 |
| 3,472,476 A | * | 10/1969 | Johnson | A47B 57/10 108/146 |
| 4,100,858 A | | 7/1978 | Bue et al. | |
| 4,133,271 A | | 1/1979 | Carlson | |
| 4,136,622 A | | 1/1979 | Bue et al. | |
| 4,446,796 A | | 5/1984 | Wilson et al. | |
| 4,596,484 A | * | 6/1986 | Nakatani | F16B 7/1454 248/188.5 |
| 4,750,432 A | | 6/1988 | McNamara et al. | |
| 4,932,333 A | | 6/1990 | Jensen et al. | |

(Continued)

FOREIGN PATENT DOCUMENTS

| | | |
|---|---|---|
| DE | 39 40 809 A1 | 6/1991 |
| EP | 2 468 985 A1 | 6/2012 |

OTHER PUBLICATIONS

International Search Report and Written Opinion for Application No. PCT/US2107/018115 dated Apr. 26, 2017.

*Primary Examiner* — Hanh V Tran
(74) *Attorney, Agent, or Firm* — Merchant & Gould P.C.

(57) ABSTRACT

A rectangular stage includes a deck supported by a frame and removable legs. The legs insert into a corner receiving assembly below the stage deck at each corner. The leg receiving assembly includes a cylindrical socket into which the top of the leg inserts. The leg receiving assembly also includes a retaining linkage that extends through a slot in the side of the socket and engages the leg. The retaining linkage also includes a manually actuatable latch coupled to the cam to maintain the cam in engagement with the leg.

17 Claims, 14 Drawing Sheets

(56) References Cited

U.S. PATENT DOCUMENTS

| | | | |
|---|---|---|---|
| 5,074,224 A | 12/1991 | Stascheit | |
| D327,779 S | 7/1992 | Jensen et al. | |
| 5,205,087 A | 4/1993 | Jines | |
| 5,415,302 A * | 5/1995 | Carlson | A47B 55/02 108/147.13 |
| D413,734 S | 9/1999 | Bue | |
| 6,017,009 A * | 1/2000 | Swartz | A47B 57/10 108/147.13 |
| 6,065,802 A | 5/2000 | Bue | |
| 6,192,808 B1 | 2/2001 | Rue | |
| 6,254,178 B1 | 7/2001 | Bue | |
| 6,386,628 B2 | 5/2002 | Bue | |
| 6,772,699 B1 | 8/2004 | Elliott | |
| 6,802,525 B2 | 10/2004 | Smith | |
| D514,830 S | 2/2006 | Bue | |
| 7,086,633 B2 * | 8/2006 | Welch | A47B 57/265 108/147.13 |
| 7,293,786 B2 | 11/2007 | Burton et al. | |
| 7,360,785 B2 | 4/2008 | Smith | |
| D573,360 S | 7/2008 | Bue et al. | |
| 7,401,754 B2 * | 7/2008 | Welch | A47B 57/545 108/110 |
| 7,611,193 B2 | 11/2009 | Bue et al. | |
| 7,712,422 B2 | 5/2010 | Bue | |
| 8,182,032 B2 | 5/2012 | Dickey et al. | |
| 8,820,826 B2 | 9/2014 | Dickey et al. | |
| 2009/0139151 A1 | 6/2009 | Quam et al. | |

\* cited by examiner

PORTABLE STAGE SYSTEM

BACKGROUND OF THE INVENTION

Field of the Invention

The present invention is directed to a stage system and in particular to a modular stage system having improved quick disconnect type mounting for legs at corners of each rectangular stage section.

Description of the Prior Art

Portable stages are utilized for creating a temporary raised stage surface. Generally rectangular stages may be joined in an edge-to-edge relationship to form an extended surface. Some stages may have adjustable legs that provide for height adjustment so that the stages may be combined for creating extending stage surfaces and be combined with stages of different heights to form raised surfaces at different heights and/or for creating a riser type configuration. The stages may be portable and some stages may have folding legs or removable legs for storage.

Permanent legs increase the footprint of the stage when stored and therefore such stages greatly increase the storage space required for a large stage system. However, it can be appreciated that removable legs and/or folding legs may have reduced stability and or capacity as compared to permanently mounted legs. To provide sufficient support for the heavier loads encountered by many stages, the legs cannot be mounted in a quick disconnect configuration. Moreover, the task of mounting and removing the legs can be laborious, time consuming and may require tools and mounting hardware that may be misplaced or lost. Properly aligning the legs with the stage may require special structures and may increase manufacturing costs and weight and time required for setting up and taking down portable stages.

It can therefore be seen that a new and improved temporary stage system is required. Such a stage system should provide for a quick connection and disconnection of each of the legs so that the stage may be disassembled when not in use. Moreover, such a leg support should be easy to manufacture and provide for securely mounting conventional straight legs in a sturdy and stable manner to safely support even heavy loads. Such a mounting system should avoid removable mounting hardware and be self-contained. The present invention addresses these as well as other problems associated with temporary portable stages and mounting removable legs.

SUMMARY OF THE INVENTION

The present invention is directed to a temporary portable stage having a stage deck supported on a frame with easily removable legs at each corner and that may be connected in an edge to edge relationship to form a raised extended stage surface.

A leg receiving assembly includes a receiving socket for engaging a top end of a corresponding removable leg. The receiving socket includes a cylindrical wall that receives the top of a corresponding leg. The portion of the leg that fits into the socket has a constant cross-section, typically cylindrical, and is not tapered and requires no special structures to engage the receiving assembly of the stage deck.

The leg receiving assembly includes a cam type engagement element that is movable between an engaged position at which the leg is engaged and retained, and a disengaged position in which the leg is released. The cam member pivots about a vertical axis and moves through a horizontal slot formed in the side of the socket wall. The leg receiving assembly also includes a latching element coupled to the cam member. The latching element is configured to pivot relative to the cam member and engage a complementary notch formed in the outer wall of the socket. After passing a toggle point in the cam-latching element linkage, the latching element snaps into a catch on the outer wall of the socket and maintains the cam in engagement with the leg. The cam is disengaged by manually moving a lever portion of the latch element toward the cam, which pivots the catch away from the wall of the socket. The leg receiving assembly is below the stage deck and inward from the frame in a location at which it will not be accidentally loosened, yet is easily accessed and manually engaged or disengaged by actuating the lever type latching element These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference letters and numerals indicate corresponding structure throughout the several views.

DETAILED DESCRIPTION OF THE PREFERRED EMBODIMENT(S)

Figure 1:
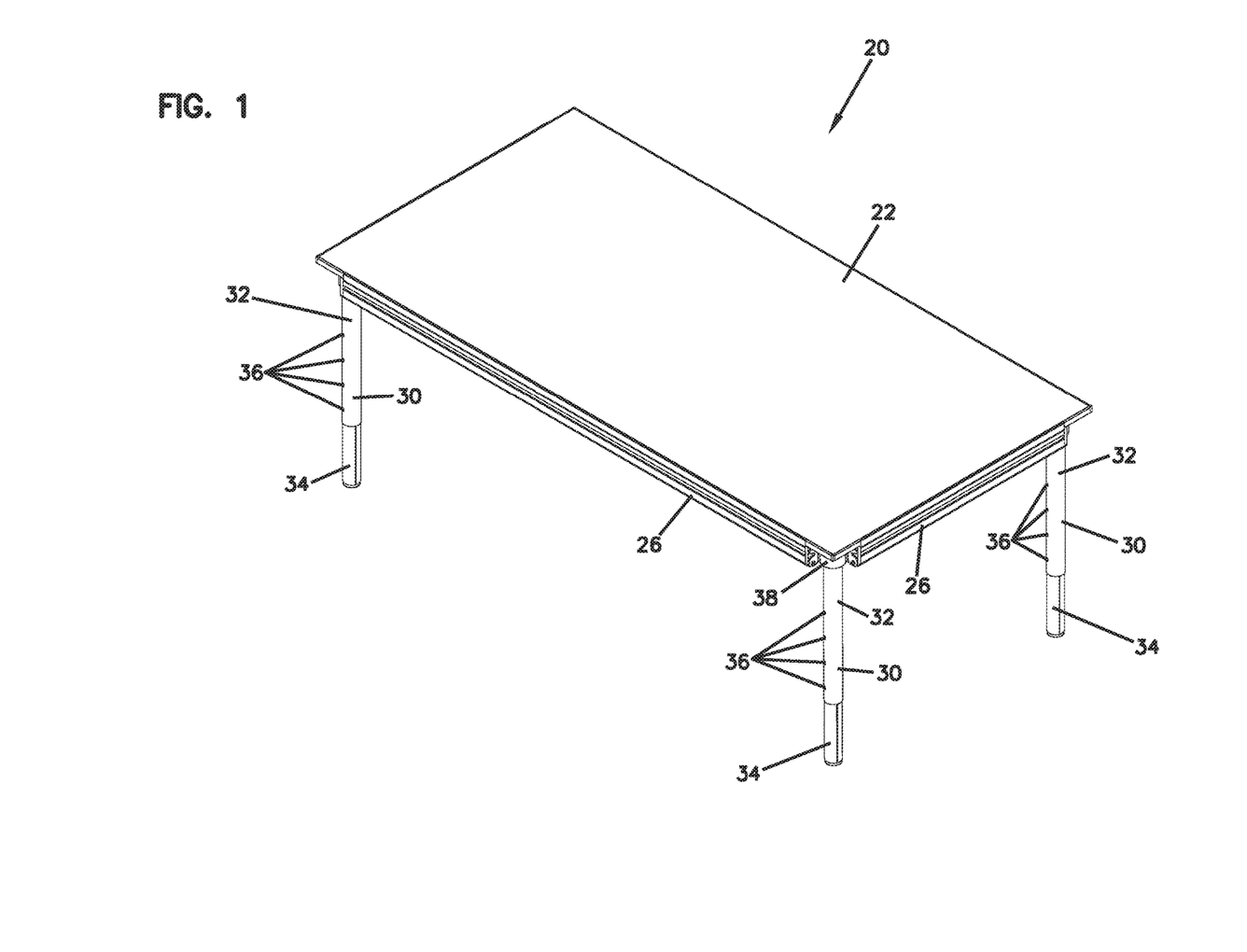
FIG. 1 is a perspective view of a portable stage according to the principles of the present invention.
Figure 2:
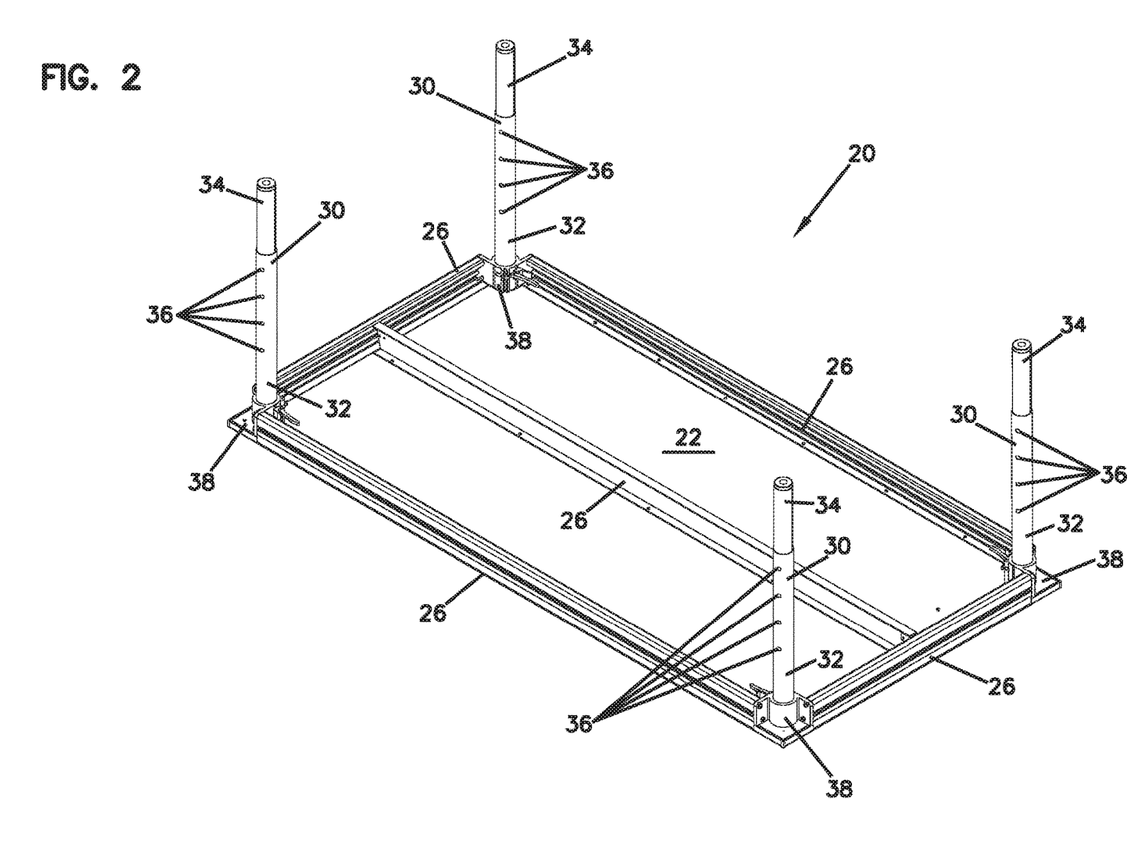
FIG. 2 is a bottom perspective view of the portable stage shown in FIG. 1.
Figure 17:
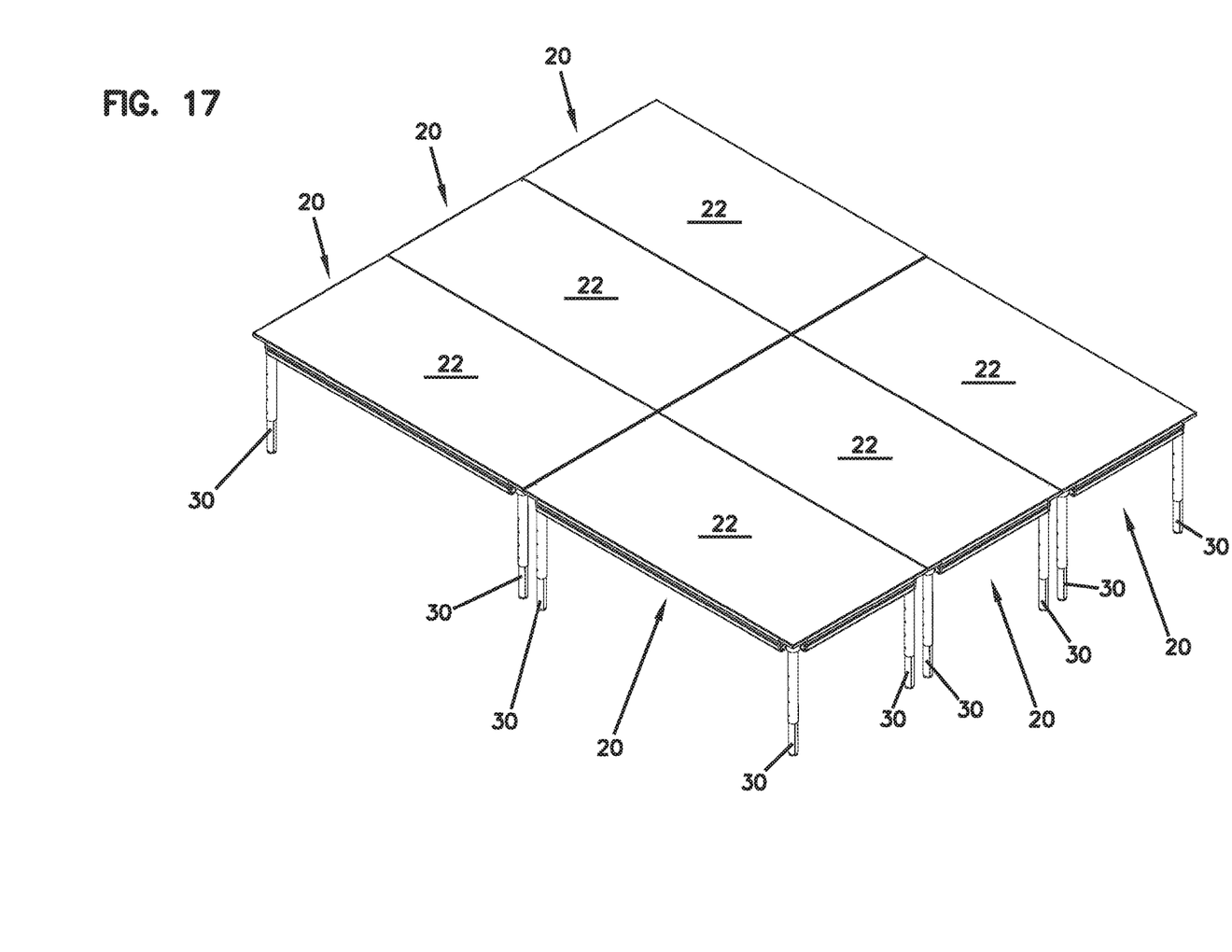
FIG. 17 is a perspective view of multiple stages joined together to form an extended stage.

Referring now to the drawings and in particular to FIGS. 1 and 2, there is shown a portable stage, generally designated (20). Such portable stages (20) are well known and include a stage deck (22). The deck (22) as shown is a conventional rectangular shape and typically in a standard size such as 4 by 8 feet, although the shape and size may vary. The deck (22) is supported by a frame (26) and legs (30) on and underside of the deck (22). The legs (30) are removable for ease of storage and transport. The frame (26) may be made of strong lightweight materials such as aluminum and may be extruded for ease of manufacture. Moreover, the stages (20) may be placed in a modular edge-to-edge relationship with other like stages to form an extended raised stage surface, such as shown in FIG. 17.

The legs (30) are removable for transport and storage, which reduces the space required for storage as the stage decks (22) may be stacked together. Each leg (30) includes an upper member (32) and a lower member (34) that telescopes relative to the upper member (32). However, it can be appreciated that the legs could have a one piece construction, particularly for stages have a short height and that do not require adjustment. A spring loaded adjustment detent inserts into corresponding height adjustment holes (36) that provide for setting the relative position between the upper member (32) and the lower member (34) and therefore also adjusts the length of the leg (30) and the height of the stage (20). In the embodiment shown there are four spaced apart adjustment holes (36), but fewer or more holes (36) may be used depending on the application and requirements of the stage (20). As explained hereinafter, the upper members (32) include straight sides with a constant cross-section, often cylindrical, and do not require an alignment element, tapering or other special configurations or special hardware for mounting to leg mounting assemblies (38). The legs also include an alignment structure to ensure proper alignment between the upper member (32) and the lower member (34), such as a guide and complementary slot within the leg.

Figure 3:
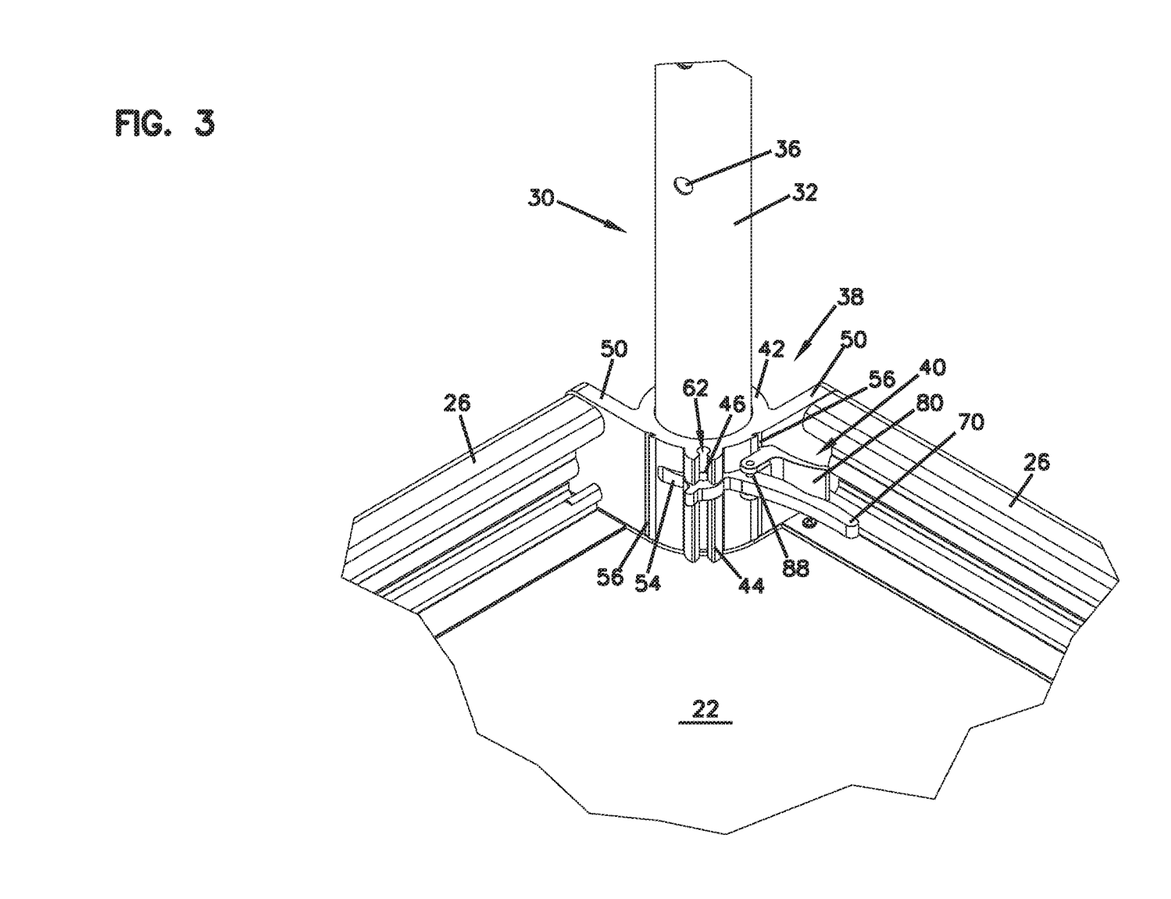
FIG. 3 is a bottom perspective detail view of a corner of the portable stage shown in FIG. 2.
Figure 4:
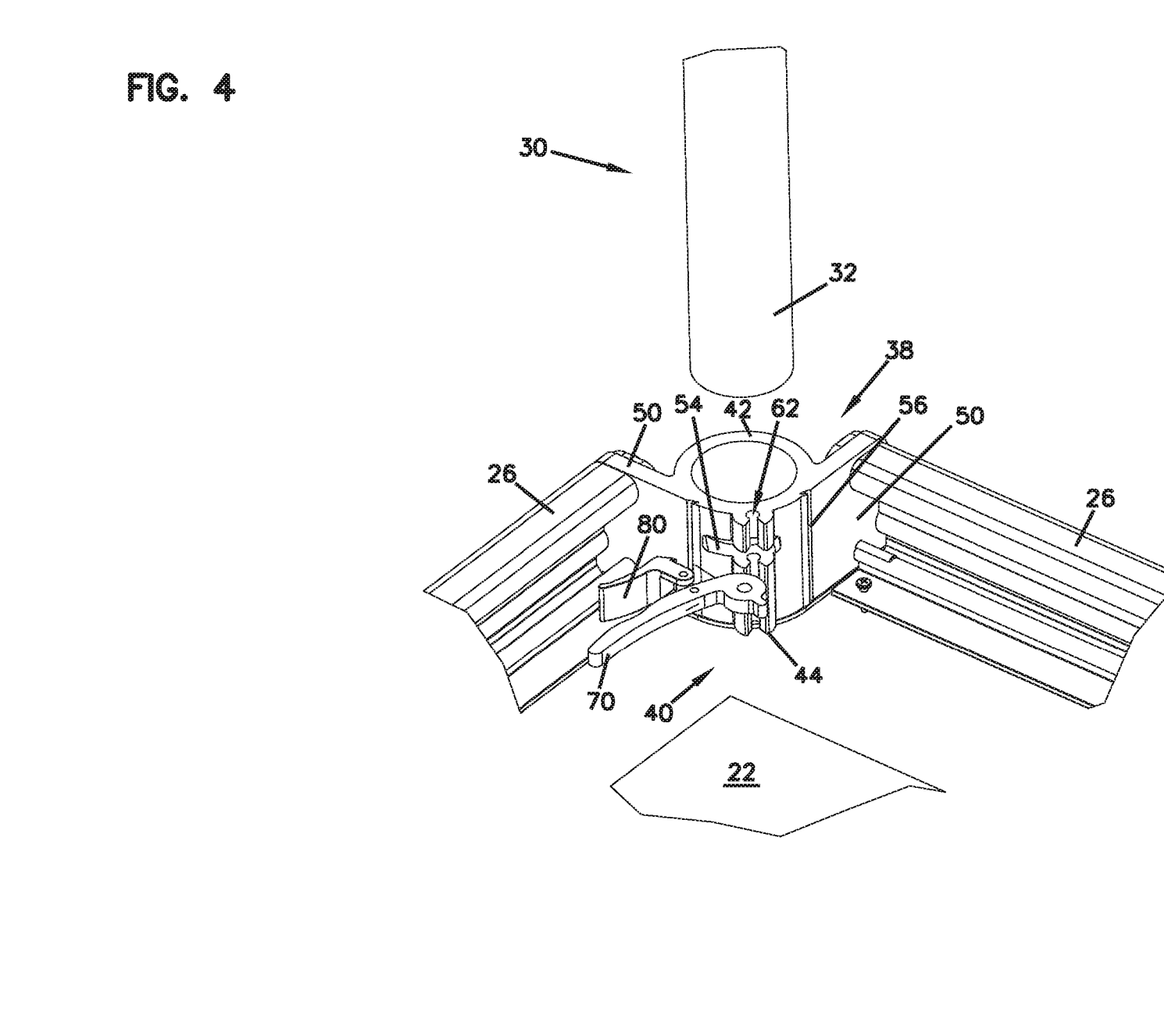
FIG. 4 is a partially exploded view of a corner of the portable stage, a leg mounting assembly and the top of a leg.
Figure 5:
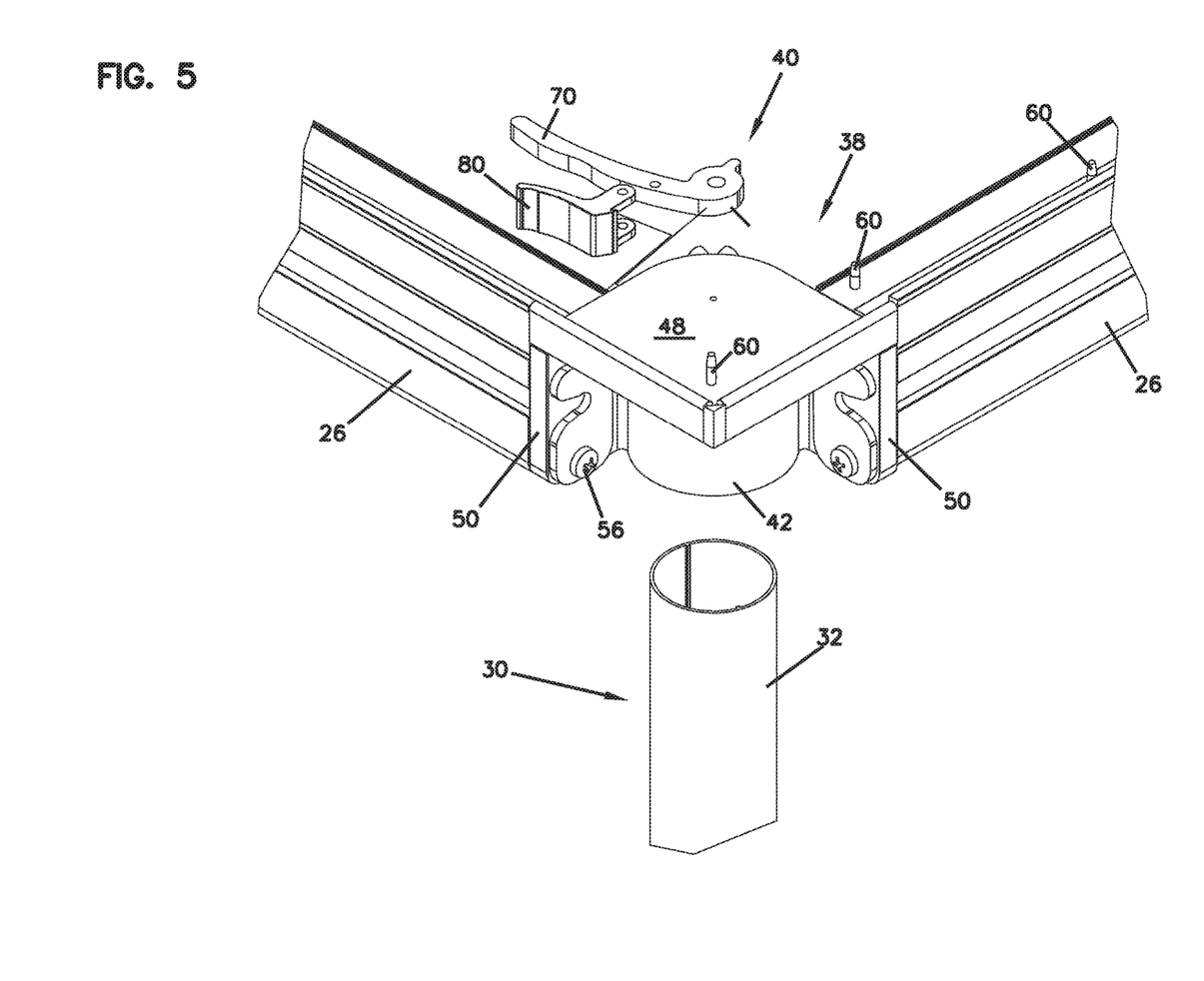
FIG. 5 is a partially exploded top perspective view of the leg mounting assembly shown in FIG. 4 shown without the deck for clarity.

As shown in FIGS. 3-5, the stage (20) includes leg mounting assemblies (38) that mount at each of the four corners of the rectangular stage below the deck (22) or at or near corners of non-rectangular stages. However, it is also foreseen that larger stages may require more than four legs. For such applications, the mounting assemblies (38) could be mounted along sides of the stage or in the center of the stage with minor modifications. Each mounting assembly (38) receives a corresponding leg (30) in a cylindrical receiving portion or socket (42). Each mounting assembly includes side mounting plates (50) abutting the frame (26) and a deck mounting plate (48) abutting the underside of the deck (22). The mounting assemblies (38) attach to the ends of the frame (26) with mounting bolts (52). In some embodiments, the frame (26) and the deck mounting plate (48) may include deck alignment members (60) that extend upward and insert into corresponding alignment cavities formed in the underside of the deck (22). The leg receiving socket (42) is cylindrical and defines a cylindrical leg receiving chamber with straight sides and is configured for receiving the straight top portions (32) of the legs. The top of the socket (42) may include radially extending ribs (58), shown in FIGS. 6 and 7, to provide added structural integrity to the socket (42).

Figure 6:
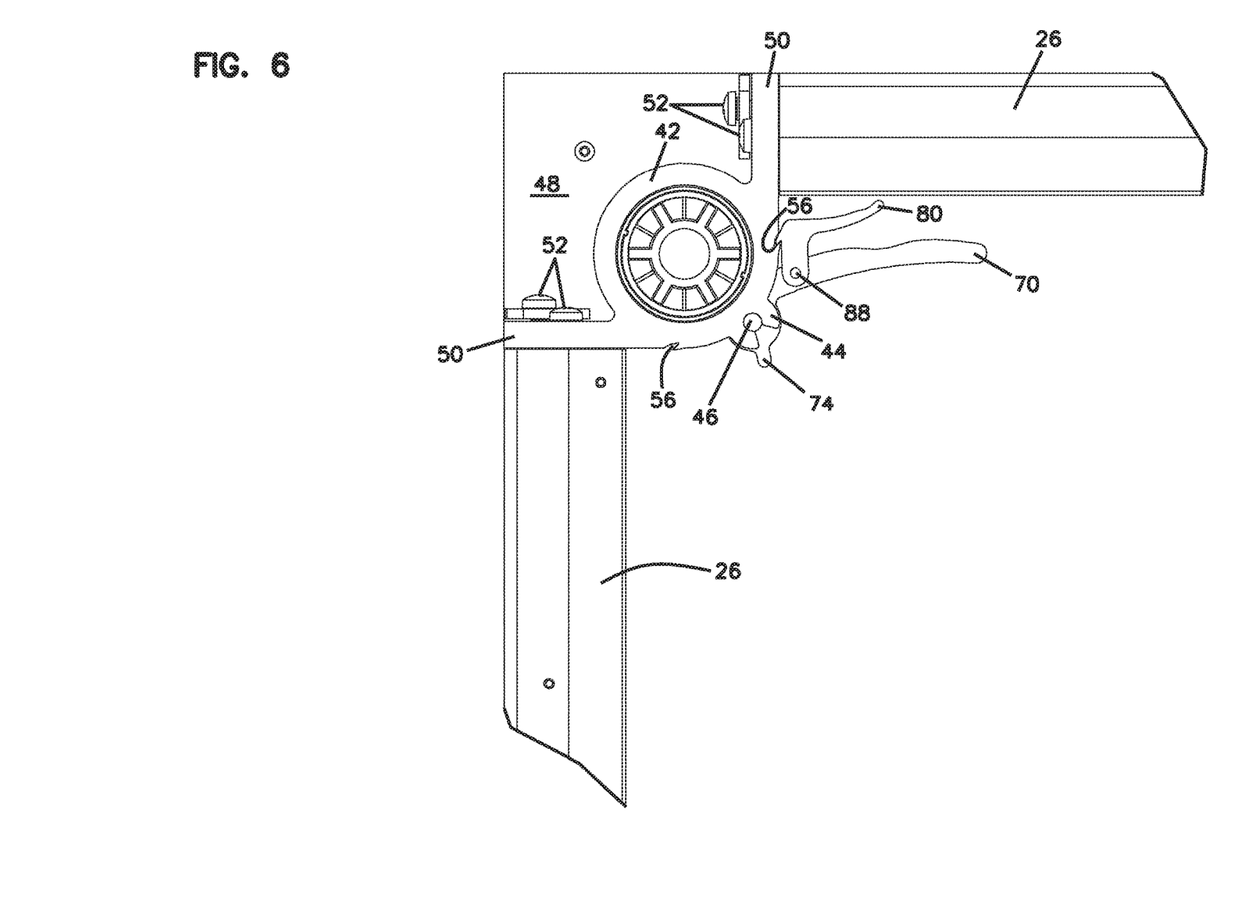
FIG. 6 is a top plan view of the leg mounting assembly and leg shown in FIG. 4 in a latched position.
Figure 8:
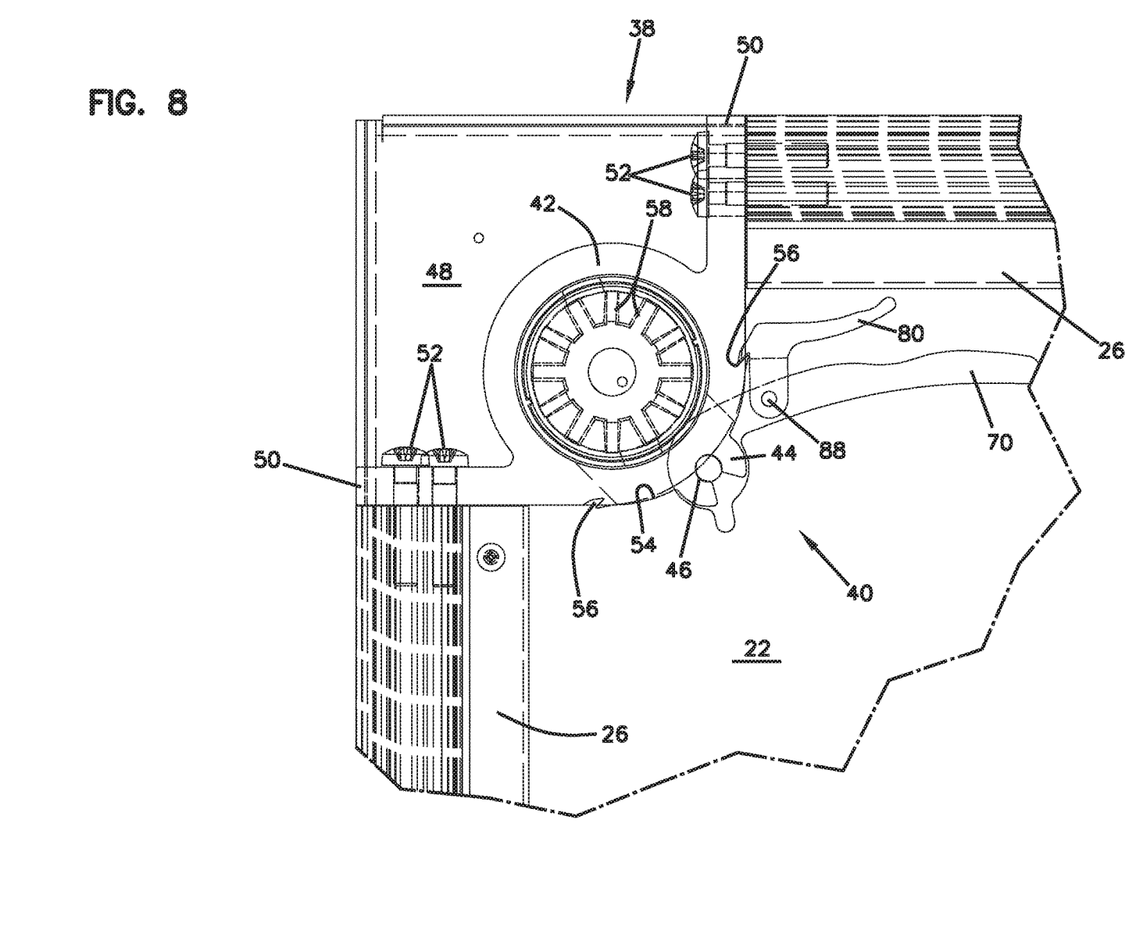
FIG. 8 is a sectional view of the leg mounting assembly shown in FIG. 6 with the latch engaged taken along a horizontal plane extending through the slot of the socket of the leg mounting assembly and the retaining assembly linkage.

The mounting assemblies (38) also include a retaining assembly (40) for camming against the leg (30) and latching the leg (30) in a retained arrangement. The retaining assembly (40) includes a hinge (44) formed in the side of the socket (42) and a slot (54) formed through the side of the socket (42) to allow a cam member (70) to extend through the slot (54) and engage a leg (30). The cam member (70) pivotally mounts to the hinge (44) with a pin (46) and is rotatable about a vertical rotational axis (62) into and out of the slot (54) to engage and disengage the leg (30). A latch (80) is coupled to the cam (70) by pin (88) about a second rotational axis (90) and may be positioned to engage a vertically extending notch (56) formed in an outer wall of the socket (42) and to retain the cam member (70) in the engaged position, as shown in FIGS. 3, 6 and 8 and thereby secure and retain the corresponding leg (30).

Figure 10:
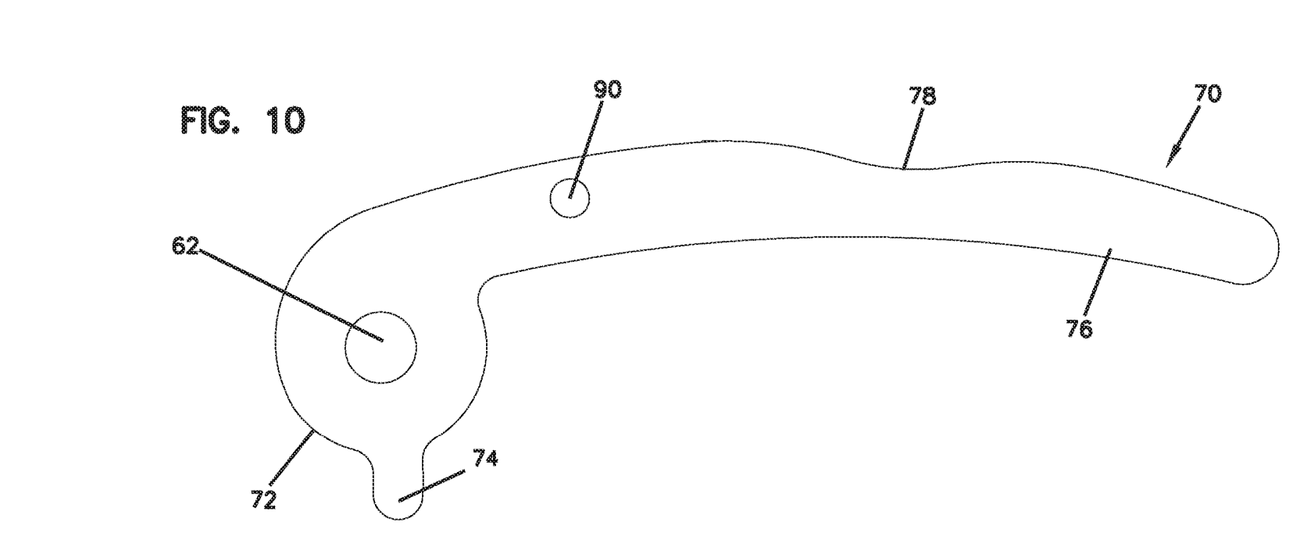
FIG. 10 is a top plan view of a cam member for the leg retaining assembly.
Figure 11:
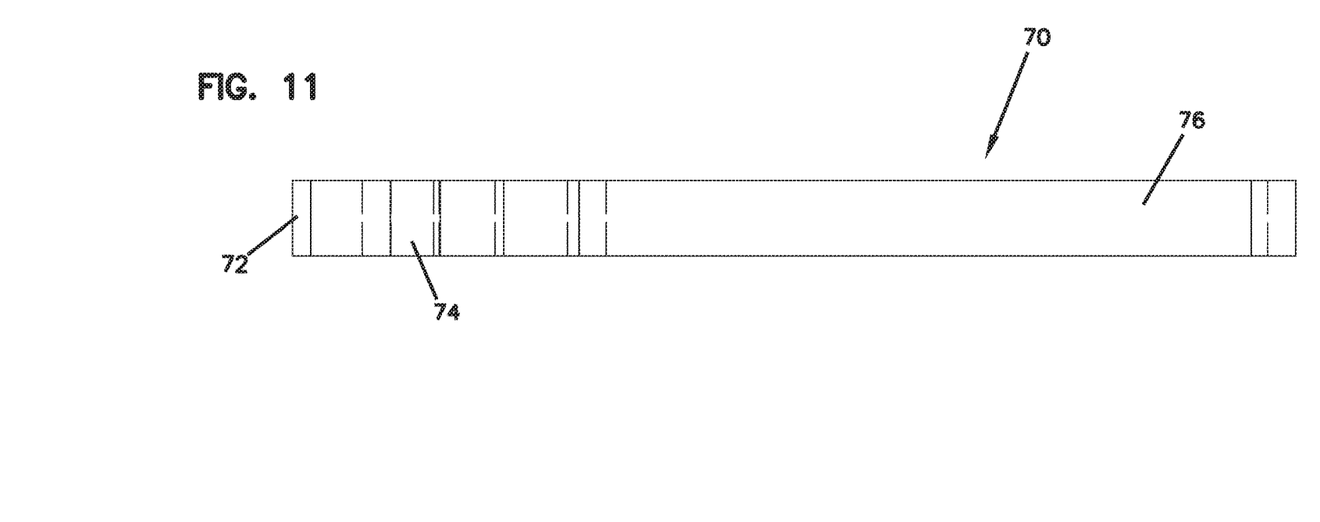
FIG. 11 is a side elevational view of the cam member shown in FIG. 10.

Referring now to FIGS. 10 and 11, the cam member (70) is an elongate member with a long handle portion (76) that can be easily gripped and provides a mechanical advantage for manual actuation. The handle portion (76) includes a slight depression (78) to provide better alignment related to relative rotation of the latch (80). The cam member (70) includes a tab (74) near the camming surface (72) that acts as a stop to prevent the cam (70) from rotating too far away from the engaged position.

Figure 12:
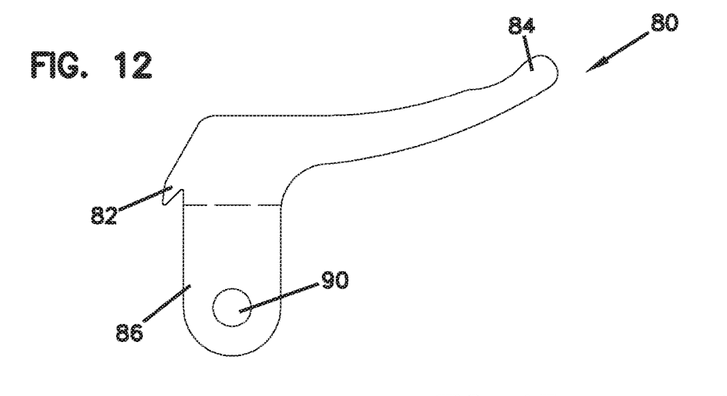
FIG. 12 is a top plan view of a latch member for the leg retaining assembly.
Figure 13:
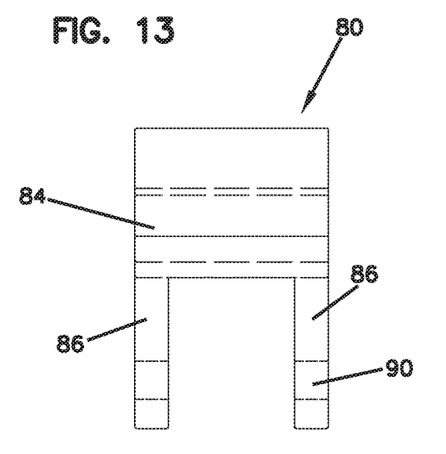
FIG. 13 is an end view of the latch member shown in FIG. 12.
Figure 14:
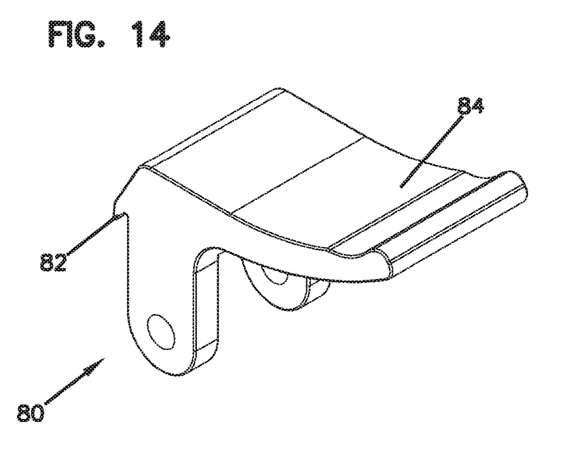
FIG. 14 is a perspective view of the latch member shown in FIG. 12.
Figure 15:
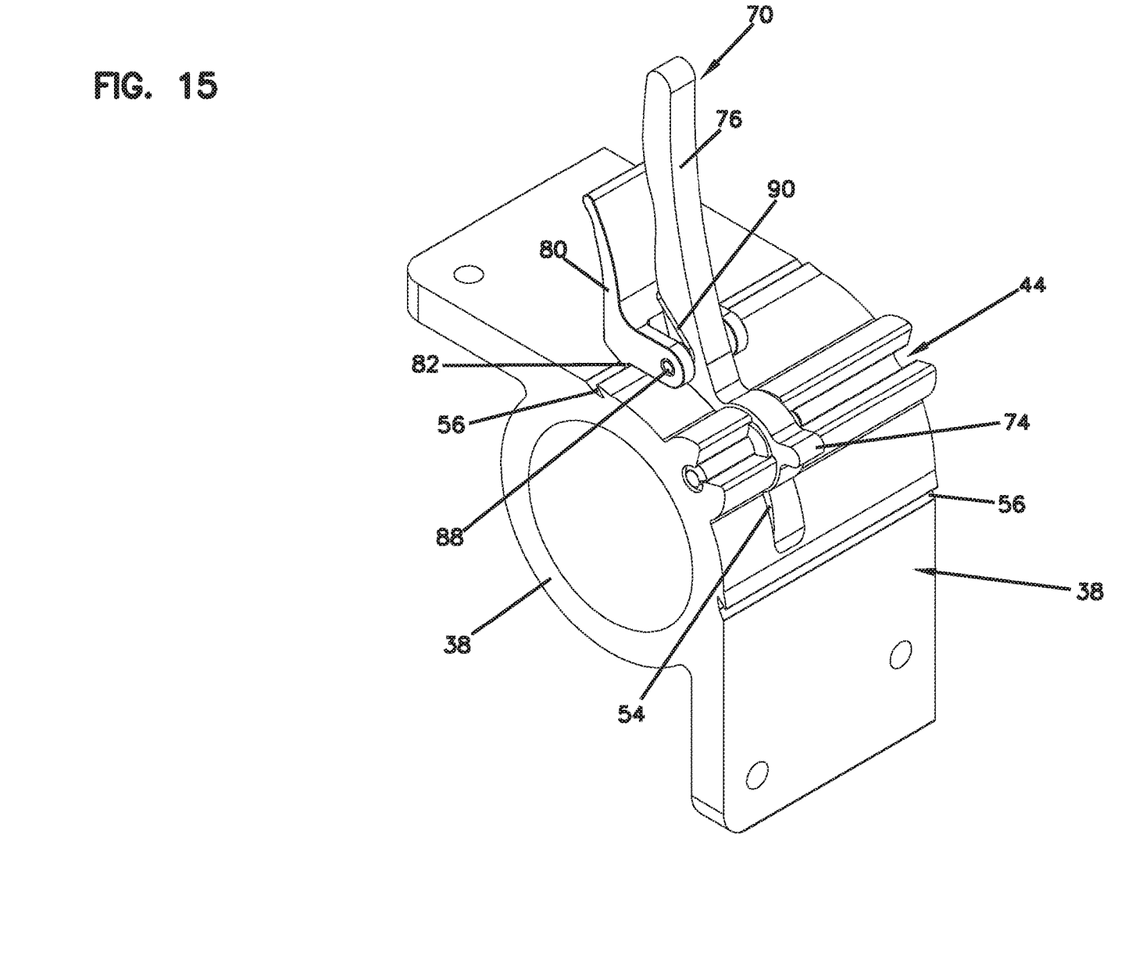
FIG. 15 is a perspective view of the latch of a retainer assembly linkage for the leg mounting assembly shown in FIG. 6.
Figure 16:
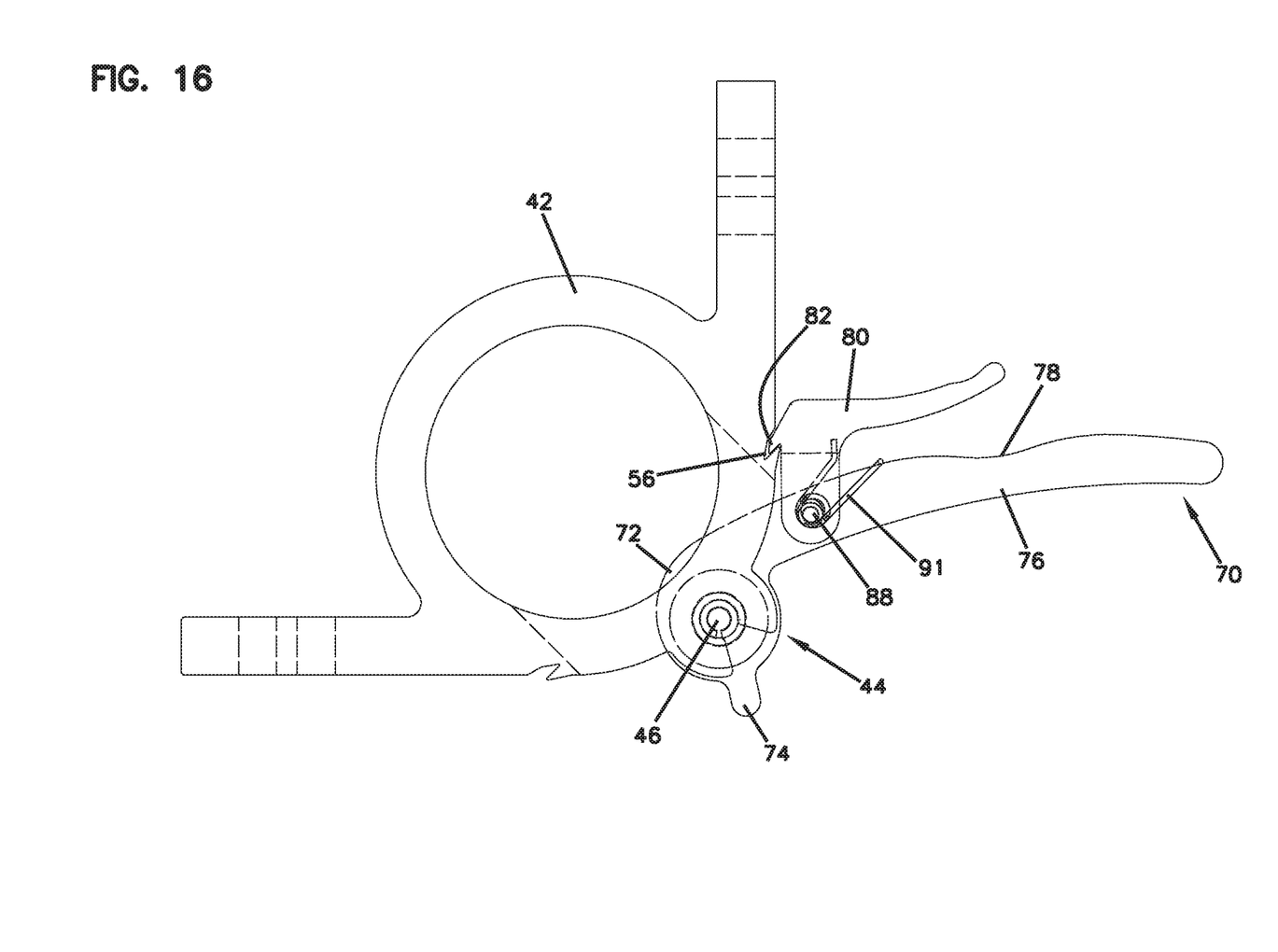
FIG. 16 is a top view of the retainer assembly and leg mounting assembly shown in FIG. 15.

As shown in FIGS. 12-14, the latch (80) includes spaced apart parallel hinge portions (86). The hinge portions (86) are configured to extend above and below the opposed faces of the cam member (70) and receive a pivot pin (88), such as shown in FIG. 3. The latch element (80) also includes a tab portion (84) that allows for easy manual actuation and is aligned to protrude into the depression (78) of the cam member (70) when the cam (70) and latch (80) are brought together. The latch element (80) defines a hook type retaining portion (82) that is complementary to and configured for engaging the notch (56) of the socket (42), such as shown in FIG. 3. Referring to FIGS. 15 and 16, a spring (91) is captured by the pin (88) and bears against the latch (80) and cam member (70) to bias the latch (80) away from the cam member (70) so that the hook type retaining portion (82) automatically engages the notch (56) in the outer wall of the socket (42).

Figure 7:
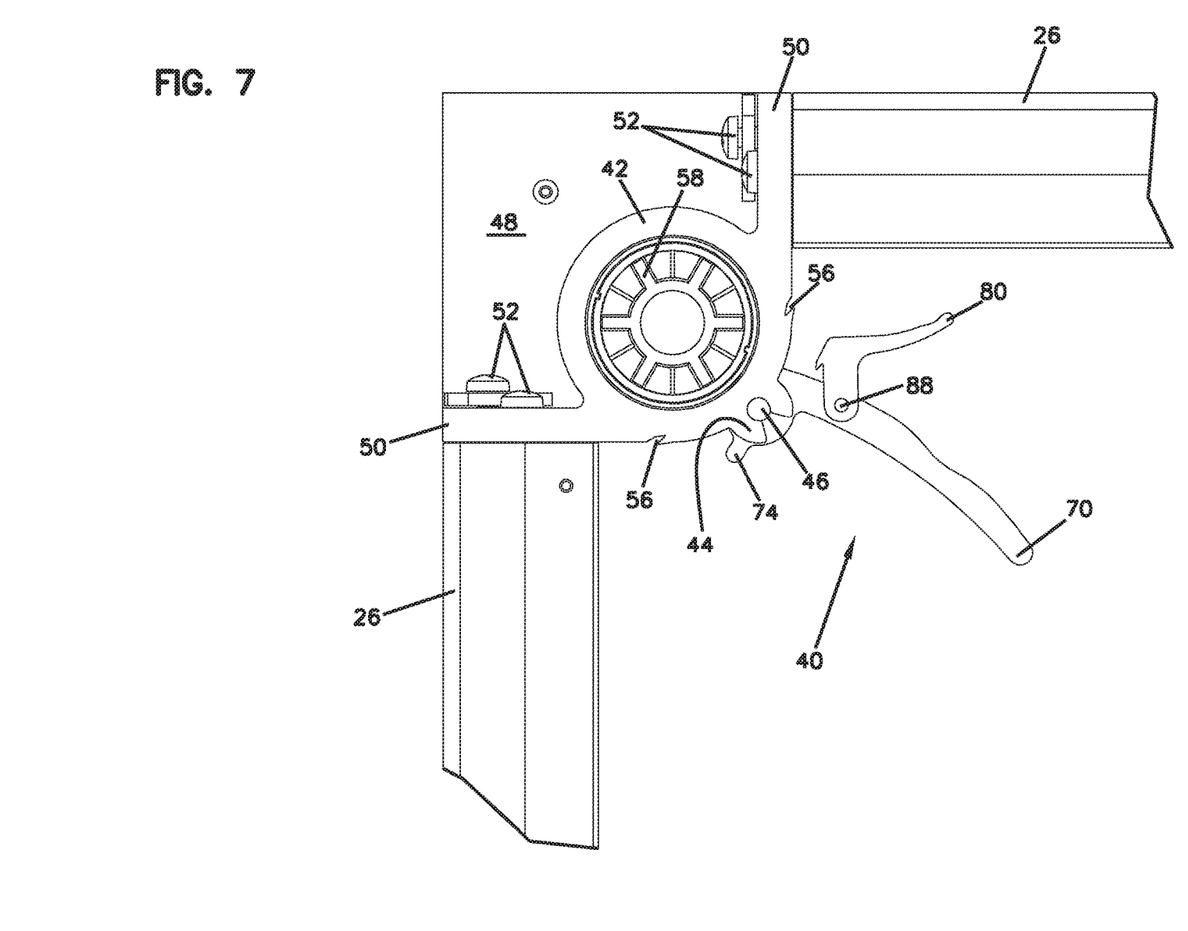
FIG. 7 is a top plan view of the leg mounting assembly and leg shown in FIG. 4 in released position.
Figure 9:
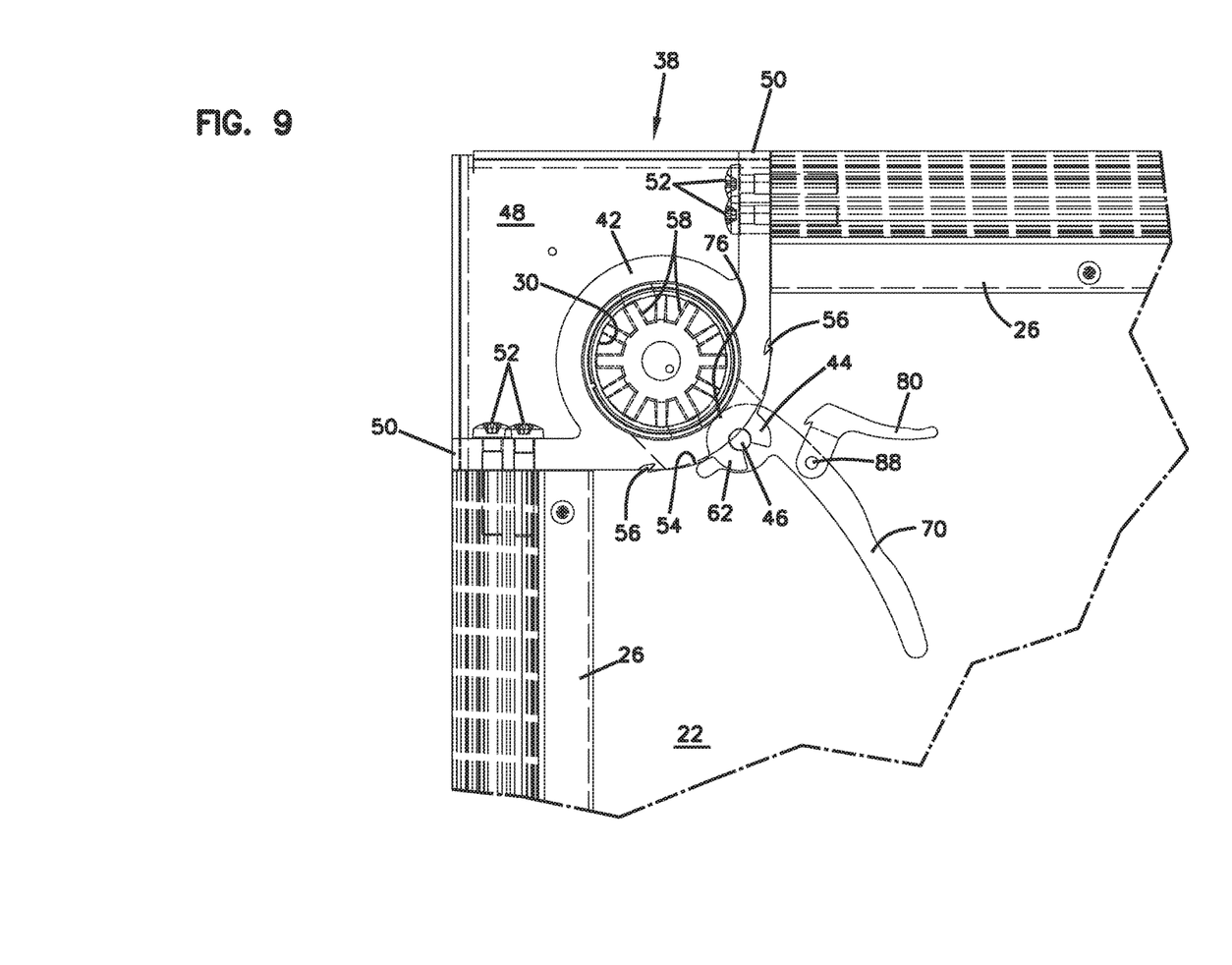
FIG. 9 is a sectional view of the leg mounting assembly shown in FIG. 7 with the latch disengaged taken along a horizontal plane extending through the slot of the socket of the leg mounting assembly and the retaining assembly linkage.

A stage (20) may be easily assembled for use and disassembled for storage without the need for any tools. Before attaching the legs (30), each of the legs (30) is adjusted to a required length by setting the relative position of the lower portion (34) to the upper portion (32) to achieve a desired height for the stage (20). The top of the leg (30) is then simply inserted into a corresponding socket (42) with the retaining assembly (40) at the disengaged position prior to and during insertion of a corresponding leg (30), as shown in FIGS. 7 and 9. Once the leg (30) is fully inserted into the socket (42), the linkage of the retaining assembly (40) is moved so that the cam surface (72) of the cam member (70) extends through the slot (54) into the socket (42) by rotating the cam member (70) about the pin (46) and vertical axis (62). The hook type catch (82) of the latch member (80) extends into and engages the notch (56) in the outer wall of the socket (42) automatically due at least in part to biasing of the spring (91). The pressure of the engagement between the cam (70) and the leg (30) and the spring (91) maintains the linkage of the retainer assembly (40) at the engaged position and the catch (82) engaging the notch (56) prevents further rotation of the retainer assembly (40). It can be appreciated that all components of the retainer assembly (40) are attached to the mounting assemblies (38) in an out of the way location when the stage (20) is in use. The deck (22) and the frame (26) protect the retainer assembly (40) from damage and/or accidentally being moved.

The legs (30) are also removed from the deck (22) without using any tools or requiring great effort. The retainer assembly (40) must be disengaged to free the corresponding leg (30). Starting from the engaged position shown in FIGS. 3, 6 and 8, the elongate portion (76) of the cam member (70) is gripped and pressure on the tab (84) of the latch member (80) rotates the tab (84) toward the elongate portion (76) of the cam member (70), which disengages the hook type catch (82) from the notch (56). The forces between the leg (30) and the cam surface (72) causes the retainer assembly (40) to rotate away from and disengage the leg (30) while the catch (82) is moved out of the notch (56). The retainer assembly (40) may be moved so that the cam (70) is completely outside the interior of the socket (42), such as shown in FIGS. 7 and 9. The leg (30) is then free and may be slid axially out of the socket (42). It can be appreciated that none of the elements of the retainer assembly (40) extend beyond the furthest point of the frame (26) so that the stages (20) may be stacked on top of one another without damaging the retainer assembly (40).

It can be appreciated that the stages (20) of the present invention provide for easy manual setup and disassembly as the legs (30) are easily connected and disconnected. The stage system also provides for setting up and taking down without use of any tools for mounting or removing legs (30) or any other structure.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A portable stage, comprising:
  a stage deck;
  a removable leg;
  a leg mounting assembly receiving the leg, the leg mounting assembly comprising:
  a receiving element forming a receiving chamber configured to receive a top portion of the leg and defining an opening extending through the receiving element to the receiving chamber, a cam element configured to rotate between a leg engagement position in which the cam element extends through the opening and engages the removable leg, and a disengaged position;
  a latch engaging the cam element and holding the cam element at the leg engagement position.

2. A portable stage according to claim 1, further comprising a spring engageable with the cam element to automatically lock the cam element at the leg engagement position.

3. A portable stage according to claim 1, further comprising a notch formed in the receiving element engaging the latch.

4. A portable stage according to claim 1, further comprising a mounting portion for mounting the receiving element to the frame.

5. A portable stage according to claim 1, wherein the receiving chamber comprises a cylindrical chamber and the top portion of the leg has a round cross section; and wherein the cam element rotates about an axis substantially parallel to a longitudinal axis of the cylindrical chamber.

6. A portable stage according to claim 1, wherein the receiving chamber has a constant inner cross section along an entire height of the chamber.

7. A portable stage according to claim 6, wherein the top portion of the leg received in the receiving chamber has a constant outer cross section.

8. A portable stage according to claim 1, wherein the receiving chamber comprises a cylindrical chamber and the top portion of the leg has a round cross section; and wherein the cam element rotates about a first axis substantially parallel to a longitudinal axis of the cylindrical chamber and the latch rotates about a second axis substantially parallel to a longitudinal axis of the cylindrical chamber.

9. A leg mounting assembly, the leg mounting assembly comprising:
  a receiving element forming a receiving chamber configured to receive a top portion of a leg and defining an opening extending through the receiving element to the receiving chamber, a cam element configured to rotate between a leg engagement position in which the cam element extends through the opening and engages the leg, and a disengaged position; a latch engaging the cam element and holding the cam element at the leg engagement position.

10. A leg mounting assembly according to claim 9, further comprising a spring engageable with the cam element to automatically lock the cam element at the leg engagement position.

11. A leg mounting assembly according to claim 9, further comprising a notch formed in the receiving element engaging the latch.

12. A leg mounting assembly according to claim 9, further comprising a mounting portion for mounting the receiving element to a stage frame.

13. A leg mounting assembly according to claim 9, wherein the receiving chamber comprises a cylindrical chamber and the top portion of the leg has a round periphery; and wherein the cam element rotates about an axis substantially parallel to a longitudinal axis of the cylindrical chamber.

14. A leg mounting assembly according to claim 9, wherein the receiving chamber has a constant inner cross section along an entire height of the chamber.

15. A leg mounting assembly according to claim 14, wherein the top portion of the leg received in the receiving chamber has a constant outer cross section.

16. A leg mounting assembly according to claim 13, further comprising a latch pivoting about an axis substantially parallel to the longitudinal axis of the cylindrical chamber, the latch being engageable with the cam element and holding the cam element at the leg engagement position.

17. A method of retaining a removable leg of a portable stage, the stage having a stage deck and a leg mounting assembly receiving the leg, the leg mounting assembly having a receiving element forming a leg receiving chamber configured to receive a top portion of the leg and defining an opening extending through the receiving element to the receiving chamber, a cam element configured to pivot between a leg engagement position extending through the opening in the receiving element, and a disengaged position, the cam element being coupled to a latch configured for selectively engaging the leg mounting assembly; the method comprising the steps of:
  inserting the leg into the leg receiving chamber;

pivoting the cam element through the opening into direct engagement with the leg; and latching the latch to the leg mounting assembly by pulling the cam member under pressure against the leg and retaining the leg.

* * * * *